US005949444A

United States Patent [19]

Geserich et al.

[11] Patent Number: 5,949,444

[45] Date of Patent: Sep. 7, 1999

[54] DEVICE FOR PRINTING STOCK

[75] Inventors: Frank Geserich; Wolfgang Von Inten, both of Berlin, Germany

[73] Assignee: Francotyp Postalia AG & Co., Birkenwerder, Germany

[21] Appl. No.: 08/791,629

[22] Filed: Jan. 31, 1997

[30] Foreign Application Priority Data

| | | | |
|---|---|---|---|
| Jan. 31, 1996 | [DE] | Germany | 196 05 015 |
| Oct. 25, 1996 | [DE] | Germany | 196 45 363 |

[51] Int. Cl.[6] .............................. B41J 3/00; B65G 15/00; B41F 17/08

[52] U.S. Cl. ........................ 347/4; 198/836.1; 198/836.2; 101/40

[58] Field of Search .............................. 347/4; 198/836.1, 198/836.2; 101/40, 35, 126; 271/2; 414/18, 271

[56] References Cited

U.S. PATENT DOCUMENTS 5,025,386 6/1991 Pusic .
5,467,709 11/1995 Salomon .

*Primary Examiner*—N. Le
*Assistant Examiner*—Thien Tran
*Attorney, Agent, or Firm*—Herbert L. Lerner; Laurence A. Greenberg

[57] ABSTRACT

A device for printing stock standing on edge, in particular a piece of mail in postage meters and/or addressing machines includes a guide plate along which the stock slides. The guide plate is inclined relative to the vertical and has a recessed region for a printing device. A rotating conveyor advances the stock along the guide plate. The printing device is an ink jet printing device with at least one ink jet print head. The recessed region includes at least one cutout and a downstream region of the guide plate is so far recessed from a bearing surface for the stock that there is no contact with the latter in that location. That ensures sufficient penetration time for ink and prevents smearing of the printed image. Pressure elements with a pressure plate are fastened to the conveyor. The pressure plate is moved against spring force toward and away from the guide plate and presses the stock against the same. A friction lining fastened to the pressure plate carries the stock. The elastic mounting of the pressure plate ensures continuous adaptation to varying thicknesses of the stock. The direct coupling of the pressure elements with the conveyor and the use of an ink jet print head enables continues transport and printing. The device improves the printing technology and simplifies transport of the piece of mail. The simple construction ensures precise feeding of the stock and a clean printed image.

50 Claims, 14 Drawing Sheets

DEVICE FOR PRINTING STOCK

BACKGROUND OF THE INVENTION

1. Field of the Invention

The invention relates to a device for printing to stock standing on edge, in particular a piece of mail in postage meters and/or addressing machines.

With such devices, the stock is guided past a printing device and the postage indicia or address is printed in a single pass.

The stock is typically guided past the printing device while lying flat as is seen in U.S. Pat. No. 5,467,709, for example, or on edge as is seen in U.S. Pat. No. 5,025,386, for example.

In each case, it is important to ensure that the stock and the printing device are brought into a defined position relative to one another so that the mark is printed in the intended location and with sufficient quality.

In the case of horizontal transport of the stock, a relatively large bearing surface, corresponding to the largest stock format to be printed, is required, thus the machine has a correspondingly large footprint.

In the device disclosed in U.S. Pat. No. 5,467,709, an ink jet print head provides contactless printing. The piece of mail is fed between a driven conveyor and spring-mounted pressure rollers, whereby the piece of mail rests against a longitudinal guide plate. The longitudinal guide plate has a cutout matching the conveyor and a rectangular cutout for the ink jet print head. A row of nozzles in the print head run along the diagonal of the cutout. The conveyor, the longitudinal guide plate and the ink jet print head are located above the piece of mail. Spring-mounted pressure rollers and a spring-mounted pressure roller located in the print area are located below the piece of mail.

The spring travel of the pressure rollers and the pressure plate corresponds to the maximum thickness of the piece of mail, which can vary between 2 mm and 20 mm.

The spring force must be appropriate for the entire range of weights of pieces of mail, approximately 20 to 1000 g, and must also ensure that the piece of mail is held sufficiently planar in the area of the cutout for the print head.

Contactless ink jet printing requires that the smallest possible distance be maintained between the stock and the ink jet print head. That both minimizes the effects of inaccurate ink spray and prevents the stock from contacting the nozzle surface, thus preventing smearing.

However, there is still a risk of smearing when the piece of mail leaves the area of the cutout and inevitably glides along the longitudinal guide plate.

These conditions are difficult to maintain when rapidly processing pieces of mail of varying dimensions.

The prior art also discloses a postage meter, as is seen in U.S. Pat. No. 5,025,386, in which the piece of mail is carried on edge and slightly inclined on a rotating conveyor. The pieces of mail rest against a guide block which has a print window. A thermal print head with which the postage indicia is printed on the piece of mail can be moved laterally and vertically within the print window.

The size of the print window must be adapted to the maximum length and width of the printed image.

The individual piece of mail is transported to the print window, then stopped and pressed through the use of a pressure plate against the guide plate or the print window. The pressure plate is driven by a motor through a toothed gearing and crankshaft. It is a relatively complex mechanism and significant counterpressure must also be provided for thermal printing.

After printing, the piece of mail is released and transported away. It is clear that only a low throughput is possible with such an intermittent mode of operation. Positioning of the thermal print head is complex.

SUMMARY OF THE INVENTION

It is accordingly an object of the invention to provide a device for printing stock standing on edge, which overcomes the hereinafore-mentioned disadvantages of the heretofore-known devices of this general type and which provides simplified transport of a piece of mail and improved printing technology. It is furthermore an object of the present invention to create a device for transporting stock standing on edge which ensures precise feeding of the stock and a clean printed image through the use of a simple construction.

With the foregoing and other objects in view there is provided, in accordance with the invention, a device for printing stock standing on edge, in particular a piece of mail in a postage meter or addressing machine, comprising a guide plate inclined relative to the vertical and having one side along which stock slides on edge in a transport direction using transport and printing, another side facing away from the stock, a downstream end, a recessed region having at least one cutout, and a region following the at least one cutout toward the downstream end as seen in the transport direction being free of contact with the stock; means, such as a rotating conveyor or any other suitable advancing device, for applying an advancing force to the stock to advance it along the guide plate in the transport direction; at least one ink jet print head of an ink jet printing device to be located at the other side of the guide plate at the recessed region; and pressure elements movable at the advancing device toward and away from the guide plate for pressing the stock against the guide plate and establishing a force-locking connection with a side of the stock facing away from the guide plate during transport and printing.

The direct coupling of the pressure elements with the conveyor and the use of an ink jet print head enables continues transport and printing. Since printing is contactless, the required pressures are low and friction on the guide plate can be minimized through the use of a correspondingly smooth surface and sliding rails.

In accordance with another feature of the invention, the configuration of the region of the guide plate downstream of the print area or the cutout ensures that the stock is not supported at this location. This ensures a sufficiently long penetration time for the ink, preventing smearing of the printed image.

In accordance with a further feature of the invention, the fact that the nozzle plane is recessed relative to the region upstream of the cutout and that the downstream region is even farther recessed or open prevents the stock from catching on one of the edges.

Specifically, the region of the guide plate downstream of the cutout is either itself cut away or recessed relative to the bearing surface for the stock by an amount which is greater than the greatest expected convexity of the stock in the printed area. This clearance is achieved either by mechanical shaping, such as through the use of the mold in the case of plastic injection molding, or through the use of some metal removing process.

In the latter two variants, this amounts to only a few tenths of a millimeter, but can be as much as two millimeters to achieve the desired graduated recess.

In accordance with an added feature of the invention, the installation of sliding rails running in the direction of transport on the guide plate greatly reduces the bearing surface for the pieces of mail and thus the friction. The aforementioned unsupported area for the printed area of the stock is easily realized in that the sliding rails are farther apart than the printed image is wide and thicker than the greatest expected convexity of the stock.

In accordance with an additional feature of the invention, there is provided an insert of stainless steel as the structured portion of the guide plate, which provides several advantages. This insert can be stamped or cut to size from a piece of sheet metal. Stainless steel can be highly polished, it resists abrasion and it has good sliding properties. This improves the sliding behavior of the plastic molded pressure elements when there is no stock between these elements and the guide plate. Finally, the metal effectively dissipates static electricity.

In accordance with yet another feature of the invention, if the postage indicia and address are to be printed in a single pass, an ink jet print head can still be used but an appropriate positioning mechanism for the print head is then required.

If there is a separate ink jet print head for each cutout or print function, not only is there no need for a positioning mechanism, but different colored inks can also be used, such as red for the postage indicia and black for the address.

The guide plate and the conveyor form a 90° angle. By superimposing imaginary coordinate axes over the device with the x axis extending in the direction of transport or along the length of the conveyor, the z axis across the width of the conveyor and the y axis from the bottom to the top of the guide plate, one can see that the z and x position of the stock is easily maintained through the use of the pressure elements. The angle of inclination of the guide plate is chosen in such a way that the stock is securely supported without the assistance of the pressure elements, yet the bearing force in this position is so low that abrasion is negligible.

In accordance with yet a further feature of the invention, a variant form of transport of the pieces of mail is made possible by locating the pressure elements on the conveyor.

In accordance with yet an added feature of the invention, with embodiments in which the guide plate is realized as a flat plate, the piece of mail stands on the conveyor.

In accordance with yet an additional feature of the invention, with embodiments in which the guide plate is realized as a plate bent in the shape of an L, the piece of mail stands on the short leg of the L.

In accordance with again another feature of the invention, the angle of inclination is preferably $\alpha=18°$ from the perpendicular relative to the zx plane. This minimizes the forces acting on the stock. Depending on the friction pairing, an angle of inclination ranging from greater than 90° to 135° is also possible.

In accordance with again a further feature of the invention, mounting the incremental transducer and the drive roller on a common axis and the use of a synchronous belt as the conveyor ensures precise monitoring of the conveying distance and no-slip transmission of motion.

In accordance with again an added feature of the invention, various configurations of the pressure elements are possible. The strip, ring and U-shaped clamping elements can be realized as additional elements of the conveyor and permanently attached to the latter, e.g. glued, vulcanized or bonded.

In accordance with again an additional feature of the invention, if so required, a separable, form-locking connection is also possible, such as through the use of crowned pins on the underside of the pressure elements and holes in the conveyor. The pressure elements can then be easily snapped into place but are still securely seated.

The U-shape appears to be of advantage for both the clamping elements and the pressure spring, which is guided through the use of a plunger. In accordance with still another feature of the invention, traction and sliding characteristics can be particularly well controlled through the use of a pressure element configured as a spring-loaded plunger with a pressure plate partly covered with a friction lining.

In accordance with still a further feature of the invention, continuous adaptation to the varying thicknesses of the stock and a smooth application of pressure is achieved through the use of the elastic deflection of the pressure elements and the use of specially constructed deflecting elements to achieve an appropriate transition to a force-locking connection to the stock or guide plate.

In accordance with still an added feature of the invention, the use of a suitable polyurethane material or rubber for the clamping elements and the U-shaped spring offers the advantage of greater wear resistance and noise reduction and it also permits greater variation of the spring characteristics.

In accordance with still an additional feature of the invention, a configuration of the pressure element as a pressure plate made of e.g. a suitable polyamide, covered at least in part by a friction lining of a suitable polyurethane and mounted in such a manner that movement both toward and away from the guide plate is against a spring force, offers several advantages.

Good traction characteristics with respect to the stock are realized through the use of the coated portion. The uncoated portion of the pressure plate ensures good sliding characteristics when the same is in direct contact with and slides along the guide plate. This is the case when there is no stock between the plates.

As mentioned above, spring mounting the pressure plate enables easy adaptation to a wide variety of thicknesses of the piece of mail. The construction of the remaining parts of the pressure element offers additional advantages.

In accordance with yet another feature of the invention, the pressure element includes the following parts:

- a bracket or stirrup with a front wall as a pressure plate, a top plate and a rear wall with an extension. The top plate is configured as a connecting element between the pressure plate and the rear wall;
- an axle inserted between the front and rear walls;
- a U-shaped rubber spring mounted through its center on the axle;
- a bearing bracket with a friction bearing for the axle.

In addition, the bearing bracket has cutouts in the rear wall for fastening the free ends of the U-shaped spring, whereby the ends project somewhat from the rear wall. The bearing bracket also has an opening formed into its underside in which the crowned pins of a mating plate can be inserted to form a separable, form-locking connection. The mating plate is located in a tooth space of the synchronous belt and the pins protrude through matching holes in the synchronous belt. The bearing bracket is slid over the pins until contact is made. The bearing bracket and the mating plate thus enclose the synchronous belt and the bearing bracket is securely fastened.

The pressure element can be easily assembled and mounted on the synchronous belt. The protruding ends of the U-shaped rubber spring serve as low-noise shock absorbers for the rear wall of the stirrup or bracket. Of course, the spring can be made of a suitable silicon rubber or polyurethane can be used instead of rubber.

In accordance with a concomitant feature of the invention, the construction of the rear wall with an extension for the guidance of the bracket or stirrup in the front and rear regions of the conveyor through the use of deflection elements permits simple realization through the use of a plate-like connecting link which curves gradually outward. Depending on the position of the pressure element, the connecting link either engages the pressure element gradually or instantly, or disengages the pressure element.

Other features which are considered as characteristic for the invention are set forth in the appended claims.

Although the invention is illustrated and described herein as embodied in a device for printing to stock standing on edge, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2*a*, 2*b* and 2*c* show a guide plate with an insert, in which FIG. 2*a* is a perspective view of a complete device, FIG. 2*b* a perspective view of the insert, and FIG. 2*c* is a fragmentary, longitudinal-sectional view of a print area;

DESCRIPTION OF THE PREFERRED EMBODIMENTS

Figure 1:
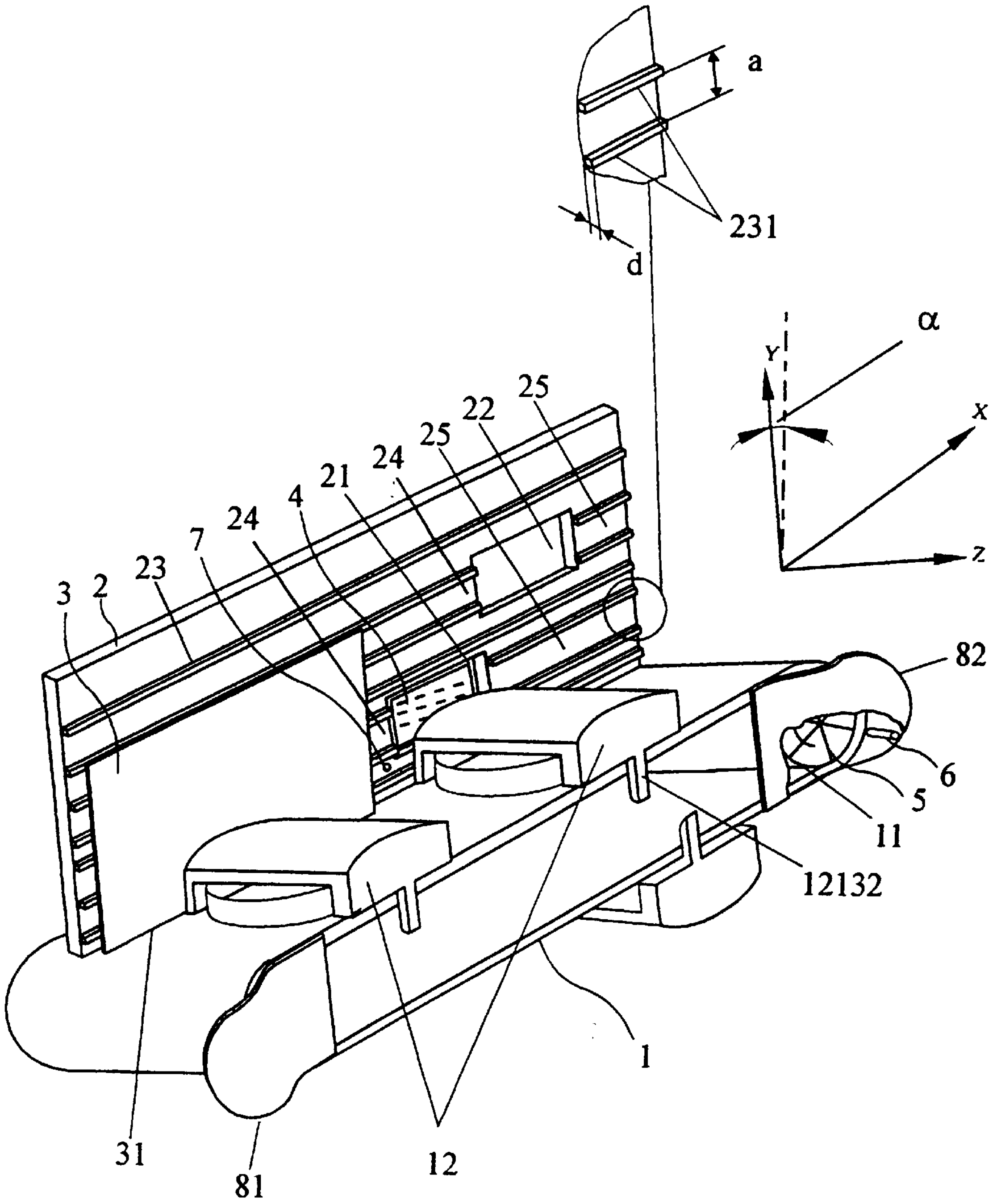
FIG. 1 is a diagrammatic, perspective view of a device according to the present invention which has a planar guide plate and with which a piece of mail is transported on a conveyor with pressure elements.
Figure 9:
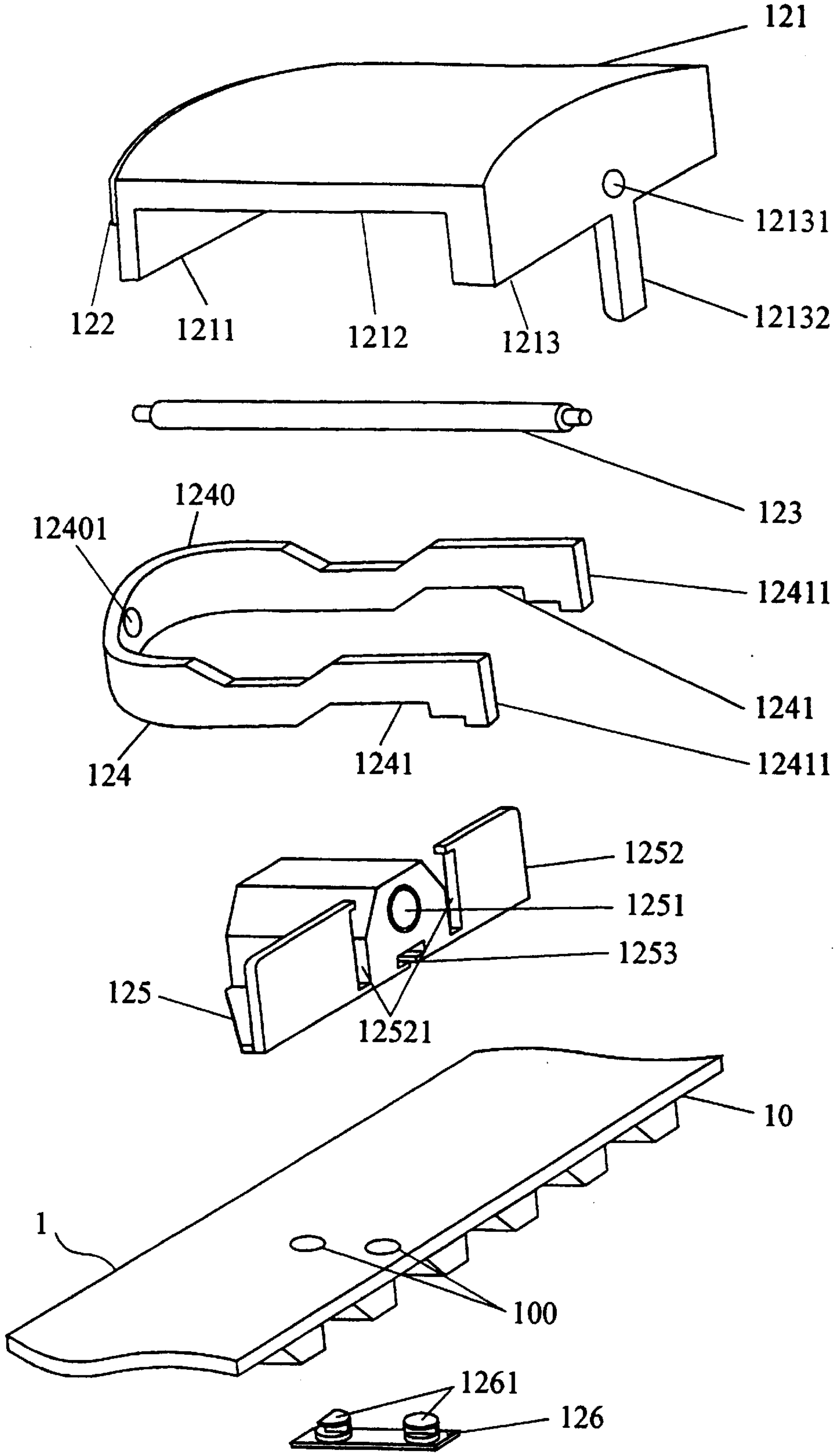
FIG. 9 is an exploded, top and rear perspective view of a pressure element with a spring-mounted pressure plate.
Figure 10:
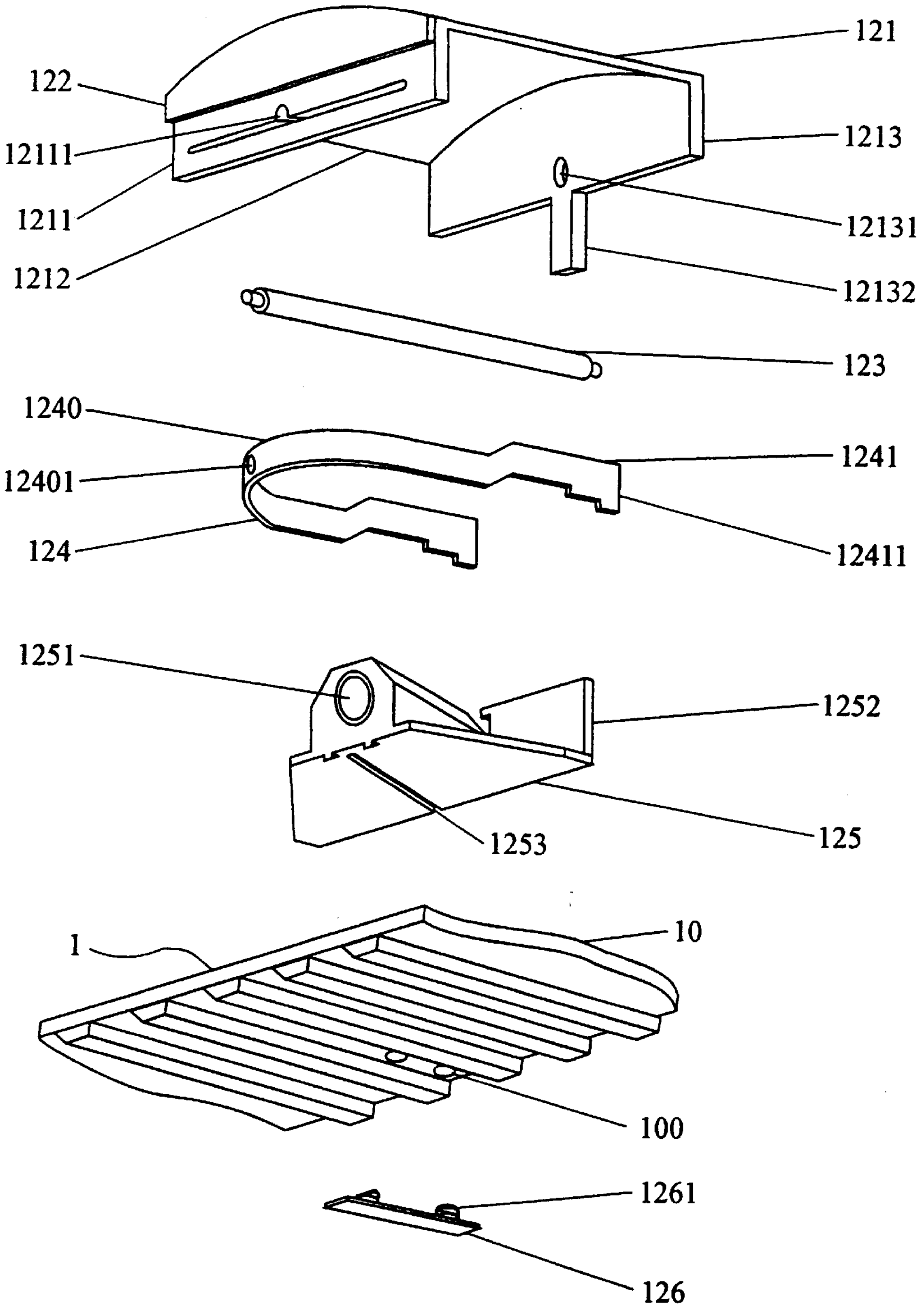
FIG. 10 is an exploded, bottom and front perspective view of a pressure element with a spring-mounted pressure plate.

Referring now in detail to the figures of the drawings, in which not all parts are shown and which are partly diagrammatic for reasons of simplicity and better comprehension, and first, particularly, to FIG. 1 thereof, there are seen pressure elements 12 which are separably fastened to a rotating conveyor 1. To this end, the conveyor 1 has holes 100 formed therein through which a mating plate 126 with crowned pins 1261 protrudes. The pins 1261 are inserted into corresponding non-illustrated openings in the pressure elements 12 as is seen in FIGS. 9 and 10.

The conveyor 1 preferably includes a synchronous belt 10 and two toothed rollers 11. The teeth are not shown for reasons of simplicity. It is appropriate that the mating plate 126 be located in a tooth space and therefore the toothed rollers 11 are correspondingly modified or include cutouts as is seen in FIG. 9.

The powered toothed roller 11, together with an incremental transducer 5, is mounted so as to be stationary on an axle in the vicinity of a print area. The incremental transducer 5 can be realized as a slotted disk illuminated by a photocell 6. A photodiode which is mounted behind the slotted disk for evaluation purposes, is not shown. The incremental transducer 5 interacts through an evaluation and control circuit with a sensor 7 for detection of a front edge of a piece of mail to initiate printing at the proper time.

Figure 4:
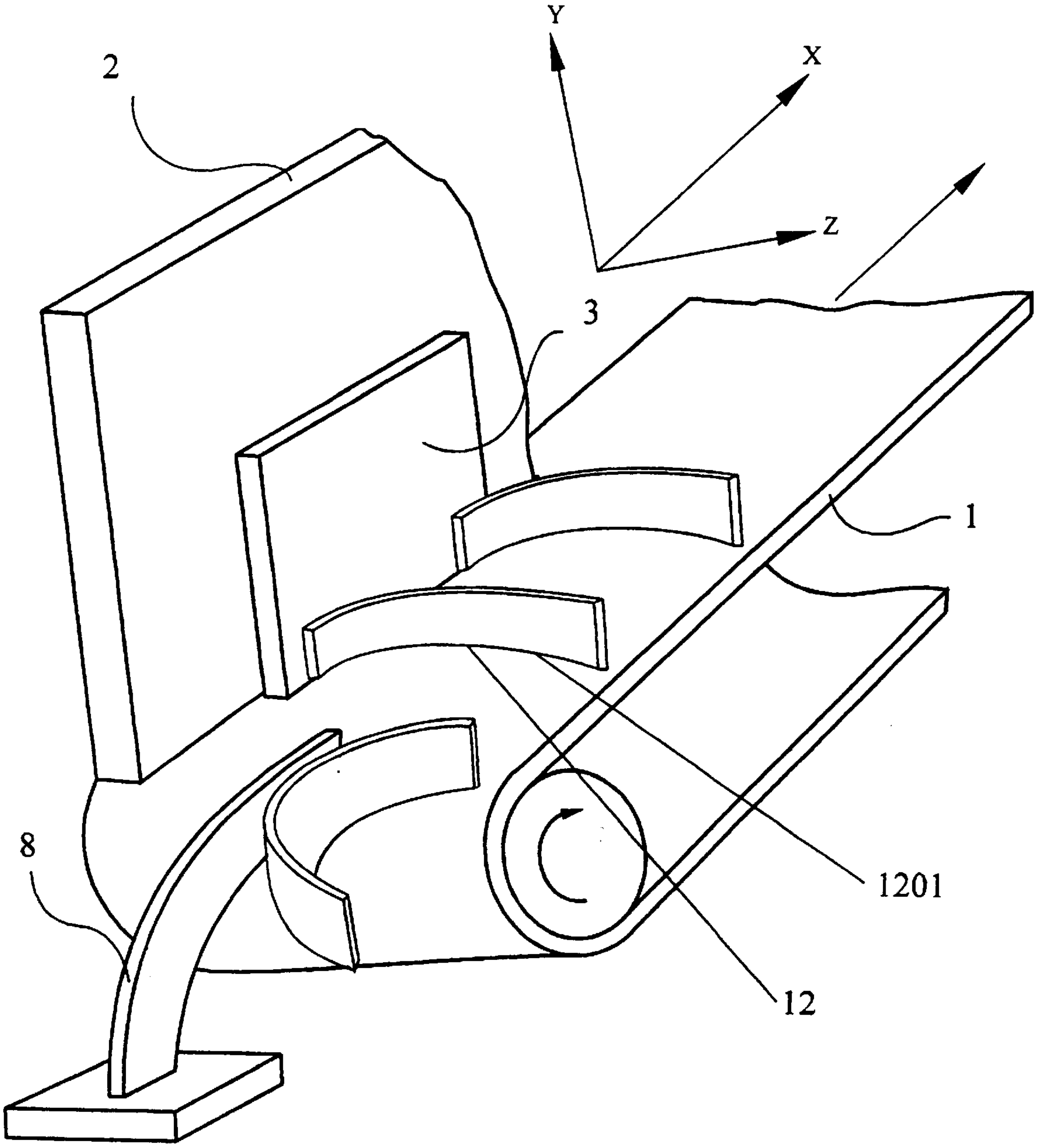
FIG. 4 is a fragmentary, perspective view of a conveyor with strip-shaped clamping elements, mounted on edge.
Figure 5:
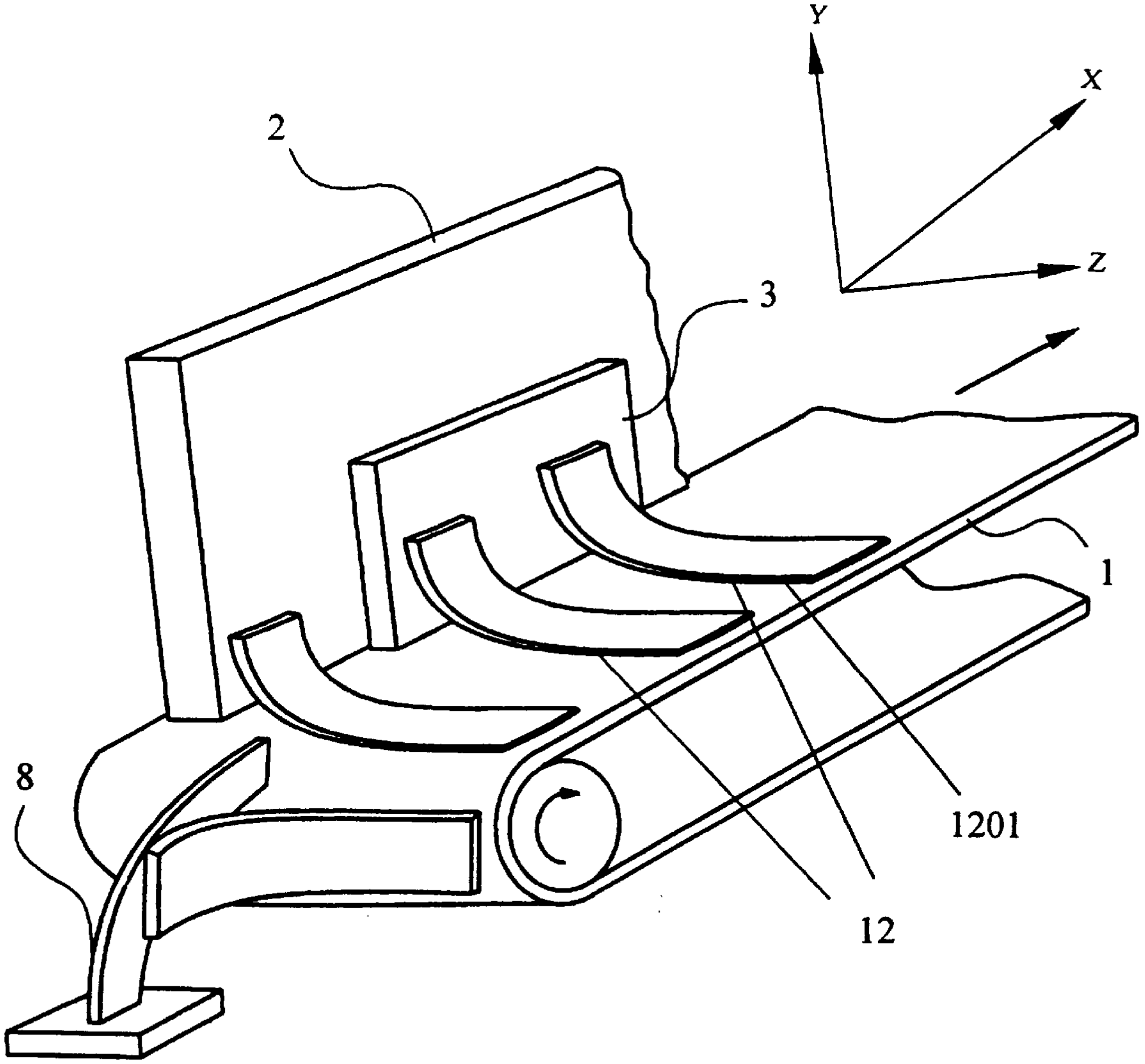
FIG. 5 is a view similar to FIG. 4 of a conveyor with strip-shaped clamping elements, mounted flat.
Figure 6:
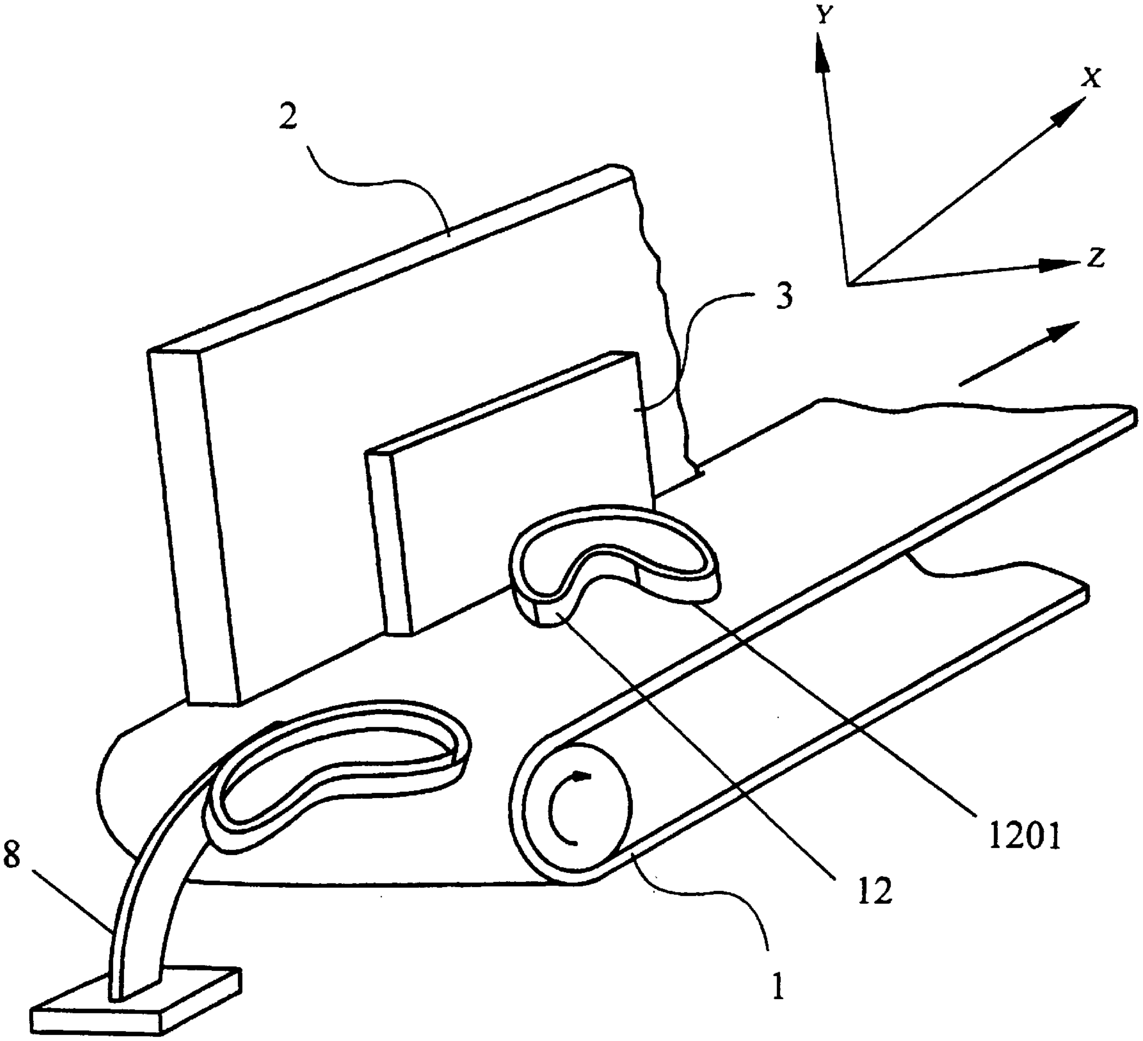
FIG. 6 is another view similar to FIG. 4 of a conveyor with ring-shaped clamping elements, mounted on edge.

Deflecting elements 8 which are seen in FIGS. 4, 5 and 6 are located outside the conveyor 1 but inside the path of the pressure elements 12 where stock such as a piece of mail 3 enters and exits the machine. In this case, these elements 8 are in the form of a connecting link which curves gradually outward. However, they can also be realized as outwardly-bent strips, as is seen in FIGS. 4 through 6. The conveyor 1 may be defined as means for applying an advancing force to the stock 3.

The deflecting elements 8 serve to bend the pressure elements 12 so far backward at the location where the piece of mail 3 enters the machine, that the thickest permissible piece of mail 3 can easily pass onto the conveyor 1.

The deflecting elements 8 serve to bend the pressure elements 12 so far backward at the location where the piece of mail 3 exits the machine, that each conveyed piece of mail 3 is released and can leave the conveyor 1 in the direction of a stacker.

Figure 3:
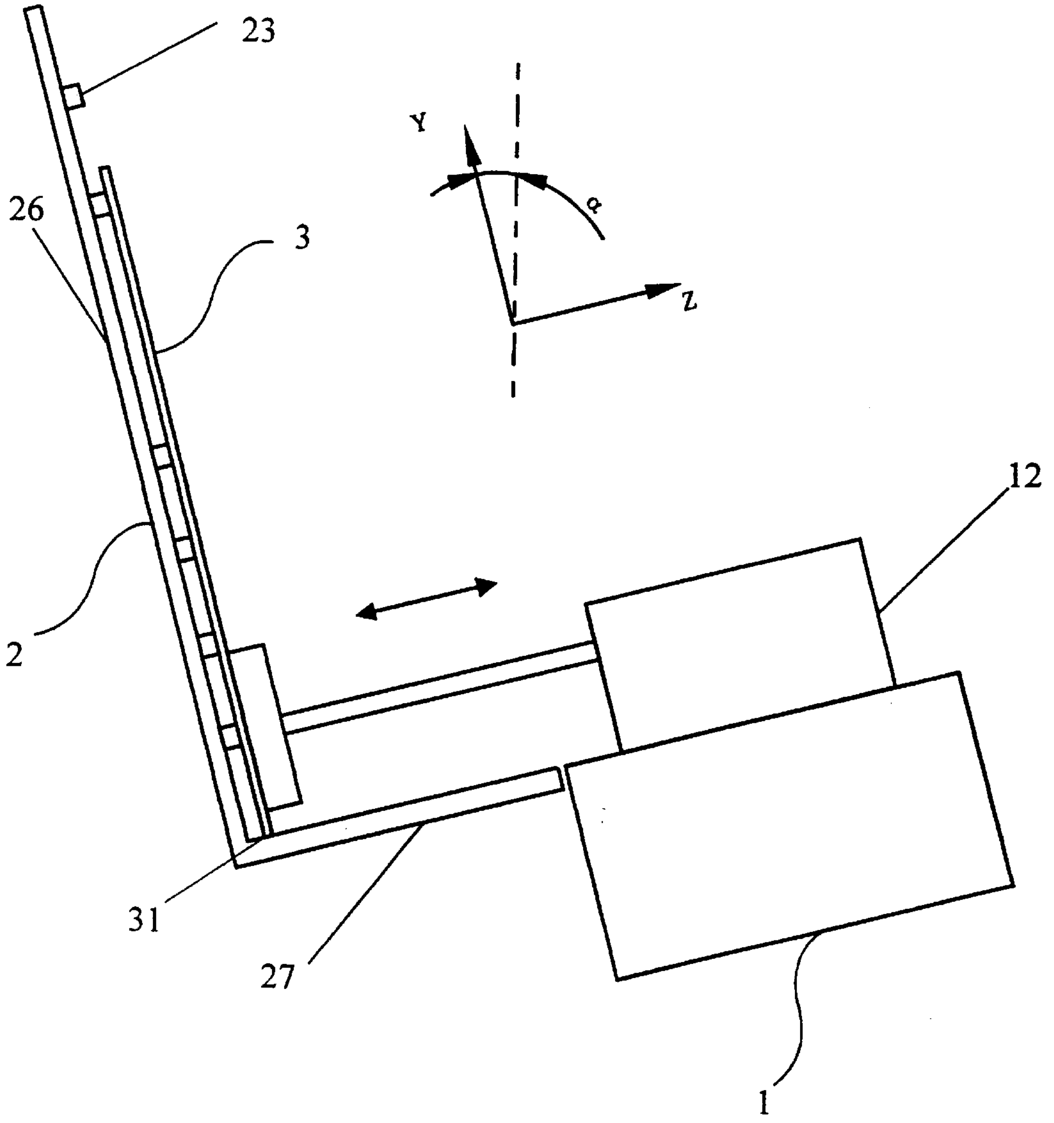
FIG. 3 is a side-elevational view of a device according to the invention which has an L-shaped guide plate and with which the piece of mail is transported on a short leg of the guide plate.
Figure 11:
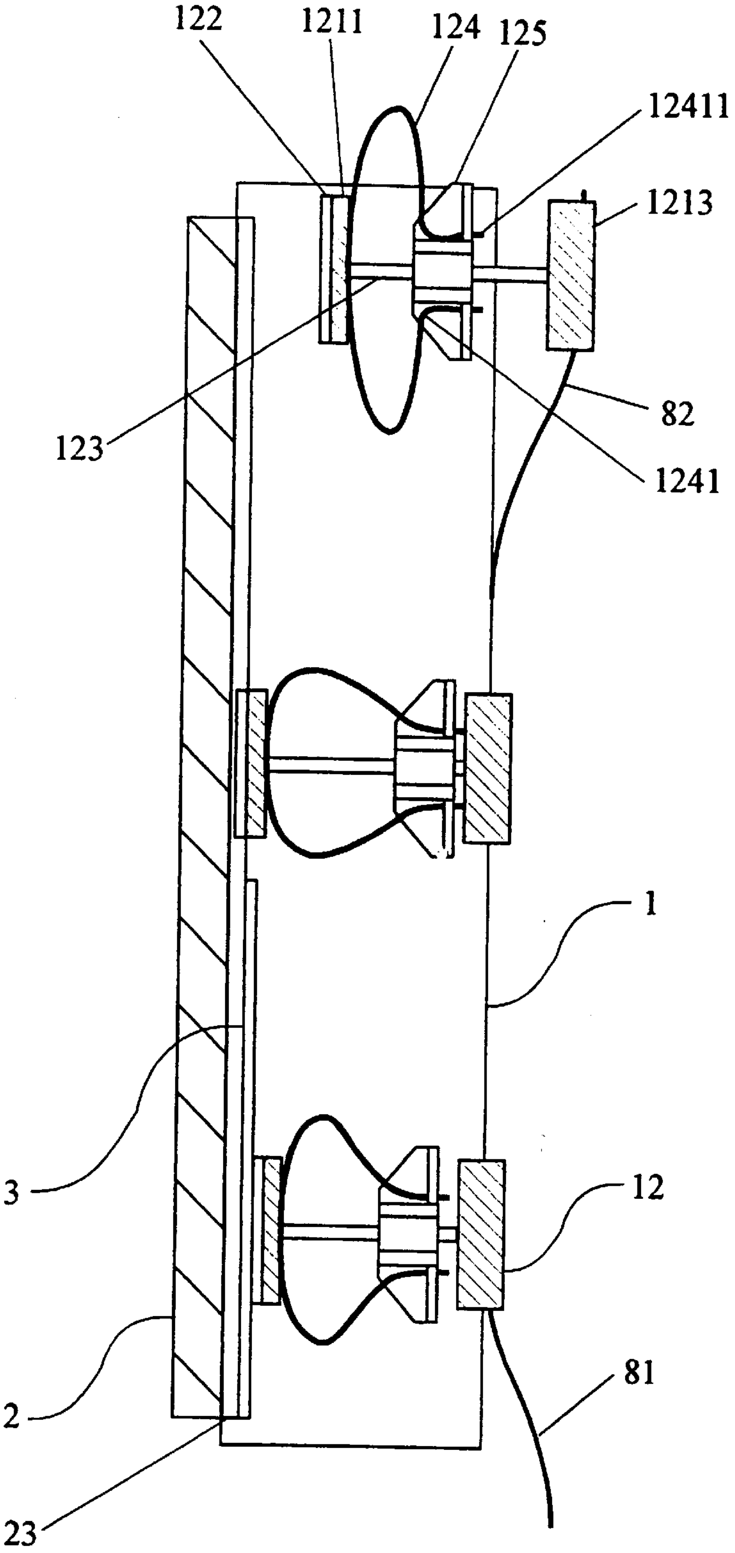
FIG. 11 is a partly sectional, plan view of the device of FIG. 1 with three possible positions for the pressure element.

During transport, the pieces of mail 3 stand on edge on the conveyor 1. The pressure elements 12 hold a surface 32 to be printed against a guide plate 2, as is indicated in FIGS. 3 and 11.

In order to pre-position the pieces of mail 3 and minimize the transport forces, the guide plate 2 is inclined at an angle $\alpha=18°$ from the vertical.

The guide plate 2 is equipped with parallel sliding rails 23, 231 extending in the direction of transport as seen in FIG. 1, in order to improve sliding characteristics.

In the print area, the guide plate 2 has a first cutout 21 for an ink jet print head 4. The cutout 21 is disposed at the height at which postage indicia is to be printed. A second, higher cutout 22 is provided in case an address is also to be printed on the piece of mail 3.

As desired, a second ink jet print head 4 can be dedicated to this cutout 22 or a common, adjustable ink jet print head 4 can be used to print both the postage indicia and the address. Regardless of which variant is used, a nozzle plane 40 of the ink jet print head 4 shown in FIG. 2*c* must always be parallel to the guide plate 2 and the piece of mail 3 must be as close as possible, within 2 mm, to the nozzle plane while fed passed the latter.

In respective regions 25 downstream of the cutouts 21, 22, the sliding rails 231 are separated by a distance a which is greater than a width b of the printed image. A thickness d of the sliding rails 231 is greater than the greatest expected convexity of the piece of mail 3 in the printed area.

Figure 2A:
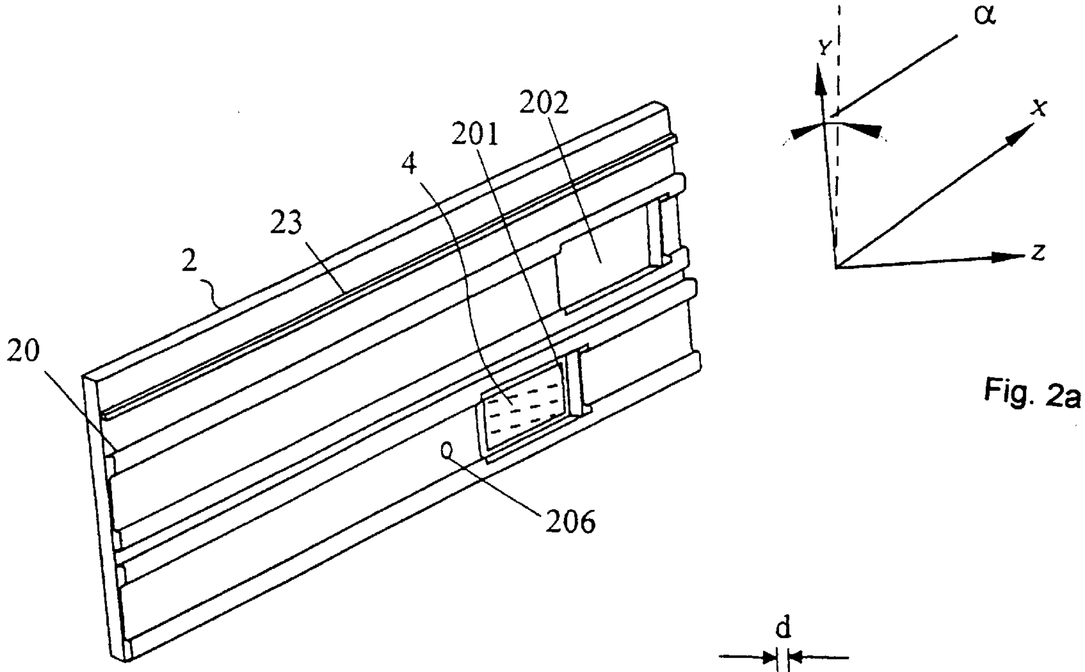

As is shown in FIG. 2*a,* the guide plate 2 is equipped in the primary support and print area for the piece of mail 3 with an insert 20 extending in the direction of transport.

Figure 2B:
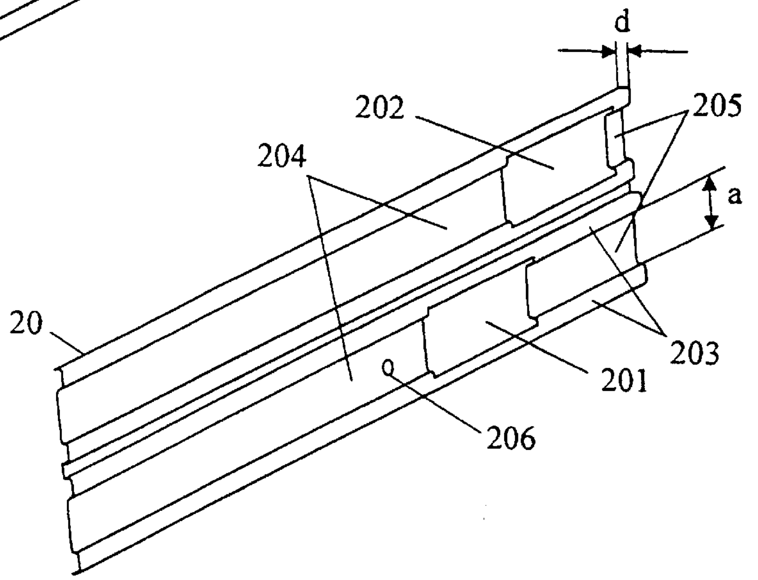

Cutouts 201, 202 for the ink jet print head 4 and an opening 206 for the sensor 7 are punched in the guide plate 2 and all other necessary structures, including sliding rails 203, are stamped into the insert 20, as is seen in FIG. 2*b.*

It is appropriate for the insert 20 to be a piece of stainless steel.

The sliding rails 203 are located above and below the cutouts 201, 202 for the ink jet print head 4 and extend over the entire length of the insert 20.

In a region 205 downstream of the cutouts 201, 202, the sliding rails 203 are separated by the distance a which is greater than the width b of the printed image. The thickness d of the sliding rails 203 is greater than the greatest expected convexity of the piece of mail 3 in the printed area. A distance a>25 mm and a thickness d=2 mm are sufficient.

Figure 2C:
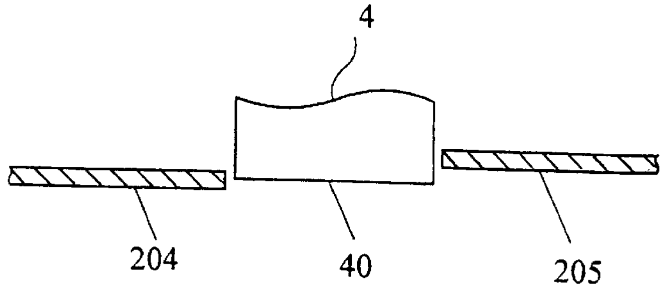

As can be seen in FIG. 2*c,* a region area 204 upstream of the cutouts 201, 202, the nozzle plane 40 of the ink jet print head 4 and a region 205 thereafter are progressively recessed. This prevents the pieces of mail from catching, thus preventing jams and increasing the reliability of transport of the piece of mail.

Production is unproblematic if the insert is manufactured from an appropriate sheet steel.

As is shown in FIG. 3, the guide plate 2 is L-shaped, whereby the piece of mail 3 stands on one edge 31 and stands on or slides along a short leg 27 of the L-shaped portion of the guide plate 2 while resting against a long leg 26 or the sliding rails 23 thereon. The two legs 26 and 27 are, of course, orthogonal to one another. The short leg 27 is highly-polished in the direction of transport. This would also be true for the entire guide plate 2 if there were no sliding rails 23.

Otherwise, this embodiment is configured analogous to that described above.

There are a variety of possible configurations for the pressure elements 12. They can be fastened in roughly the center of the conveyor 1 or at the greatest possible distance from the guide plate 2.

In the embodiment shown in FIG. 4, the pressure elements 12 are strip-shaped clamping elements standing on one longitudinal edge, perpendicular to the direction of travel and fastened to the conveyor at an end 1201 facing away from the guide plate 2.

Unlike FIG. 1, a permanent connection is preferred and can be realized through the use of gluing or bonding.

In a reversing zone at the front of the conveyor, the clamping element 12 is bent opposite the direction of transport by the deflecting element 8 and slides smoothly along the deflecting element 8, moving laterally until coming in contact with the piece of mail 3.

In the embodiment shown in FIG. 5, the strip-shaped clamping elements lie flat on the conveyor 1 and perpendicular to the direction of transport while being connected to the conveyor 1 at the end 1201 facing away from the guide plate 2. The clamping element slides along the deflecting element 8, moving downward until coming in contact with the piece of mail 3.

In the embodiment shown in FIG. 6, the clamping element 12 is realized as a ring-shaped clamping element standing on edge and being fastened to the conveyor 1 at the part 1201 farthest away from the guide plate 2.

Figure 7:
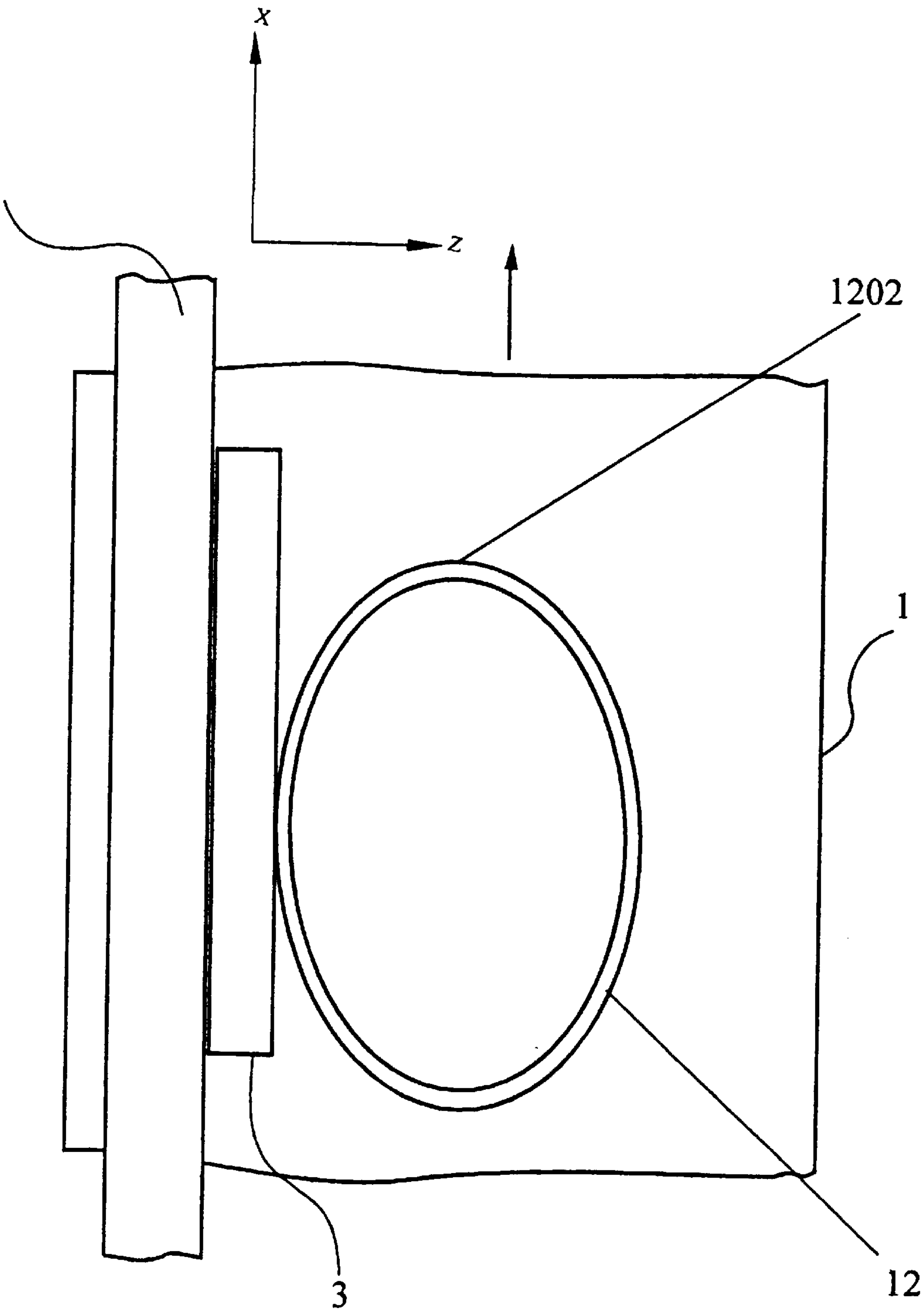
FIG. 7 is a plan view of a conveyor with ring-shaped clamping elements, center mounted on edge.

FIG. 7 shows an embodiment in which the ring-shaped clamping element 12 is connected to the conveyor 1 in the center of a frontmost section 1202 of the element relative to the direction of transport indicated by an arrow.

Figure 8:
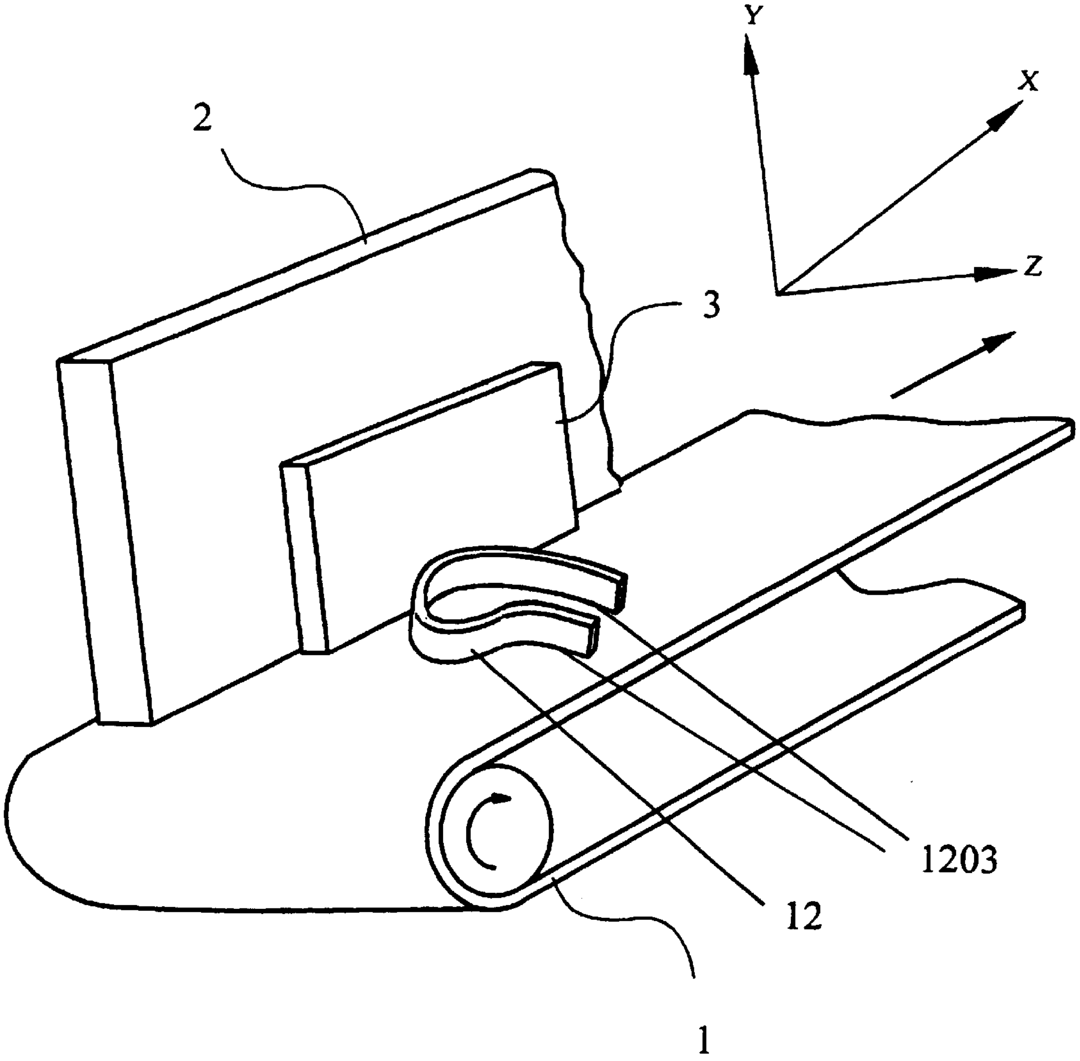
FIG. 8 is a further view similar to FIG. 4 of a conveyor with U-shaped clamping elements.

In an analogous embodiment shown in FIG. 8, the pressure elements 12 are realized as U-shaped clamping elements. The U-shaped clamping elements 12 stand on edge, are perpendicular to the direction of transport and are connected to the conveyor 1 at legs 1203, which face away from the guide plate 2. The semi-circular region of the clamping element 12 stands on edge on the conveyor 1 and deflects opposite to the direction of transport.

All of the clamping elements 12 described above are made of an elastic material, preferably a polyurethane material.

In the embodiment shown in FIGS. 9 and 10, the pressure element 12 is realized as a spring-mounted bracket 121, having an axle 123 which is mounted perpendicular to the direction of transport in a friction bearing 1251. The friction bearing 1251 is rigidly connected to a bearing bracket 125, which is in turn fastened to the conveyor 1.

Mounted on one end of the axle 123 is a pressure plate 1211 having a friction lining 122 facing the guide plate 2, so that the pressure plate 1211 can form a force-locking connection to only one piece of mail 3. A force-locking connection is one which connects two elements together by force external to the elements, as opposed to a form-locking connection which is provided by the shapes of the elements themselves.

If no piece of mail 3 is present, the pressure plate 1211 slides along the sliding rail 23 or 203, i.e. the friction lining 122 is thinner than the thickness d of the sliding rail 23, 203 or the amount by which it protrudes, and is thus free, as is seen in FIG. 11.

A cover or top plate 1212, which rests against a rear wall 1252 of the bearing bracket 125 and is terminated by a rear wall 1213, is connected to the rear of the pressure plate 1211 to prevent the pressure plate from tipping.

The pressure plate 1211 has a bore 12111 and the rear wall 1213 has a bore 12131. Both bores 12111, 12131 are used to seat the axle 123.

A U-shaped spring 124 is located between the pressure plate 1211 and the bearing bracket 125 in such a manner that a curved portion thereof rests against the pressure plate 1211 and free legs 1241 are held in the bearing bracket 125.

A center section 1240 of the spring 124 has a bore 12401 through which the spring 124 is slid onto the axle 123, where it is snugly seated.

The free legs 1241 of the spring 124 are form-lockingly connected in slot-shaped cutouts 12521 in the rear wall 1252 of the bearing bracket 125. Ends 12411 of the legs 1241 protrude somewhat beyond the rear wall 1252, thus serving as a buffered stop for the rear wall 1213 of the bracket 121.

The spring 124 is preferably made of rubber to achieve good service life, elasticity and damping characteristics. Last but not least, this material is economical.

The rear wall 1213 of the bracket 121 includes an extension 12132 which can engage the deflection elements 8. At the front of the conveyor 1, the extension 12132 engages a part 81 of the connecting link 8 curving toward the guide plate 2. At the rear of the conveyor, the extension 12132 engages a part 82 of the connecting link 8 curving away from the guide plate 2, as is seen in FIGS. 1 and 11.

FIG. 11 shows three characteristic positions which the pressure element 12 can assume. For the sake of clarity, the section below the top plate 1212 of the bracket 121 is shown. In the lower position, the pressure element 12 has just been released by the part 81 of the connecting link 8 curving towards the guide plate 2. The piece of mail 3 is clamped between the friction lining 122 and the sliding rails 23.

In the center position, there is no piece of mail present. The pressure plate 1211 rests against the sliding rail 23 and the friction lining 122 is at some distance from the guide plate 2 and is thus exposed. The rear wall 1213 of the bracket 121 rests against the ends 12411 of the U-shaped spring 124.

In the upper position, the pressure element 12 is pulled away from the guide plate 2 by the part 82 of the connecting link curving away from the guide plate 2. The spring 124 is compressed and the rear wall 1213 rests with the extension 12132 seen in FIG. 10 against the deflecting element 82.

Figure 12:
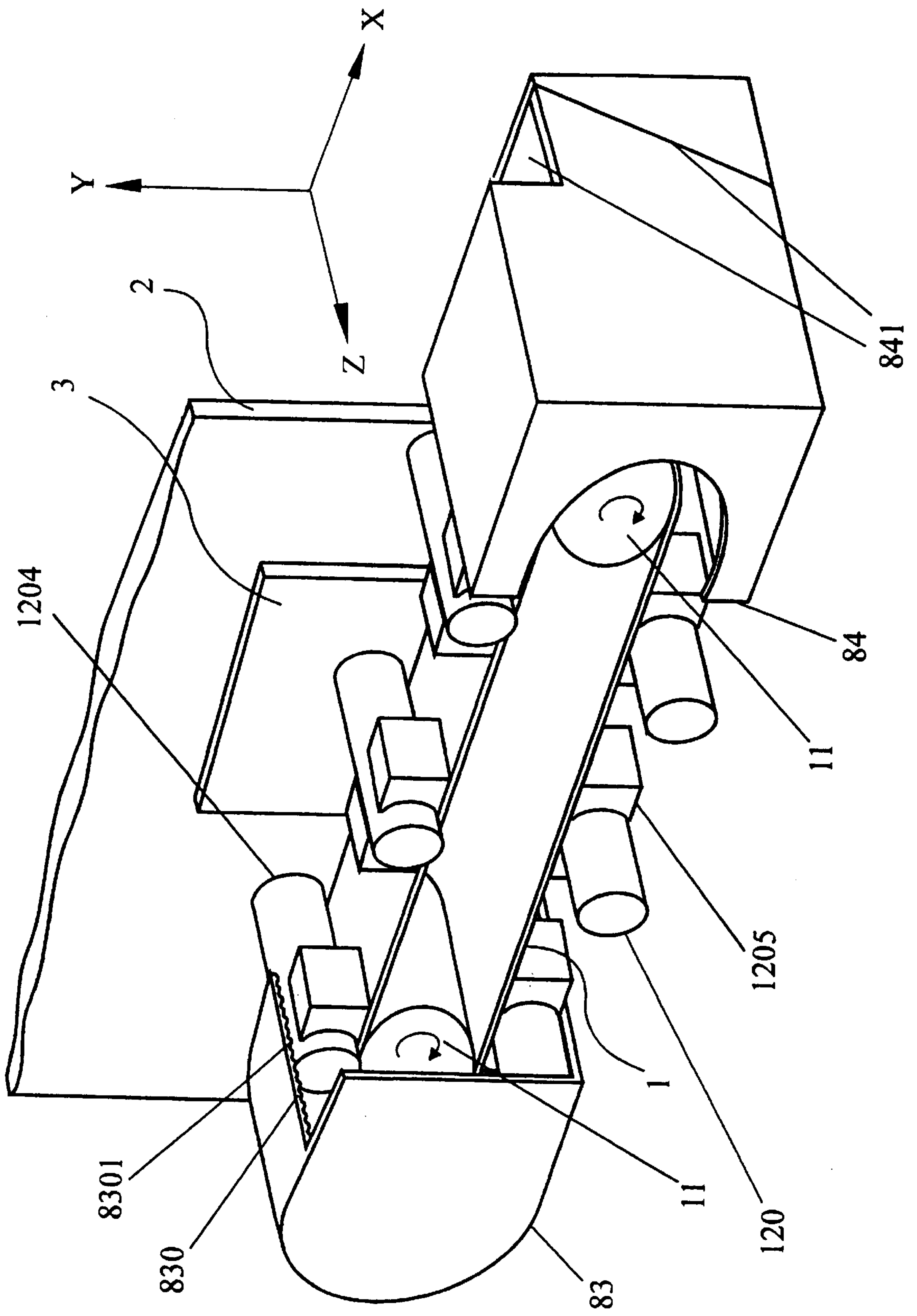
FIG. 12 is a fragmentary, perspective view of a conveyor with solid cylinders and clamping jaws.

In FIG. 12, the pressure elements 12 are realized as elastic, solid cylinders 120 that are held perpendicular to the direction of transport between clamping jaws 1205. The clamping jaws 1205 are fastened to and extend across the width of the conveyor 1. The piece of mail 3 is clamped between an end surface 1204 of the solid cylinder 120 and the guide plate 2. The clamping jaws 1205 are spread apart where the conveyor 1 reverses due to the curvature of the conveyor 1, so that the solid cylinders 120 lie loosely between the clamping jaws 1205 and can be easily displaced.

Figure 13:
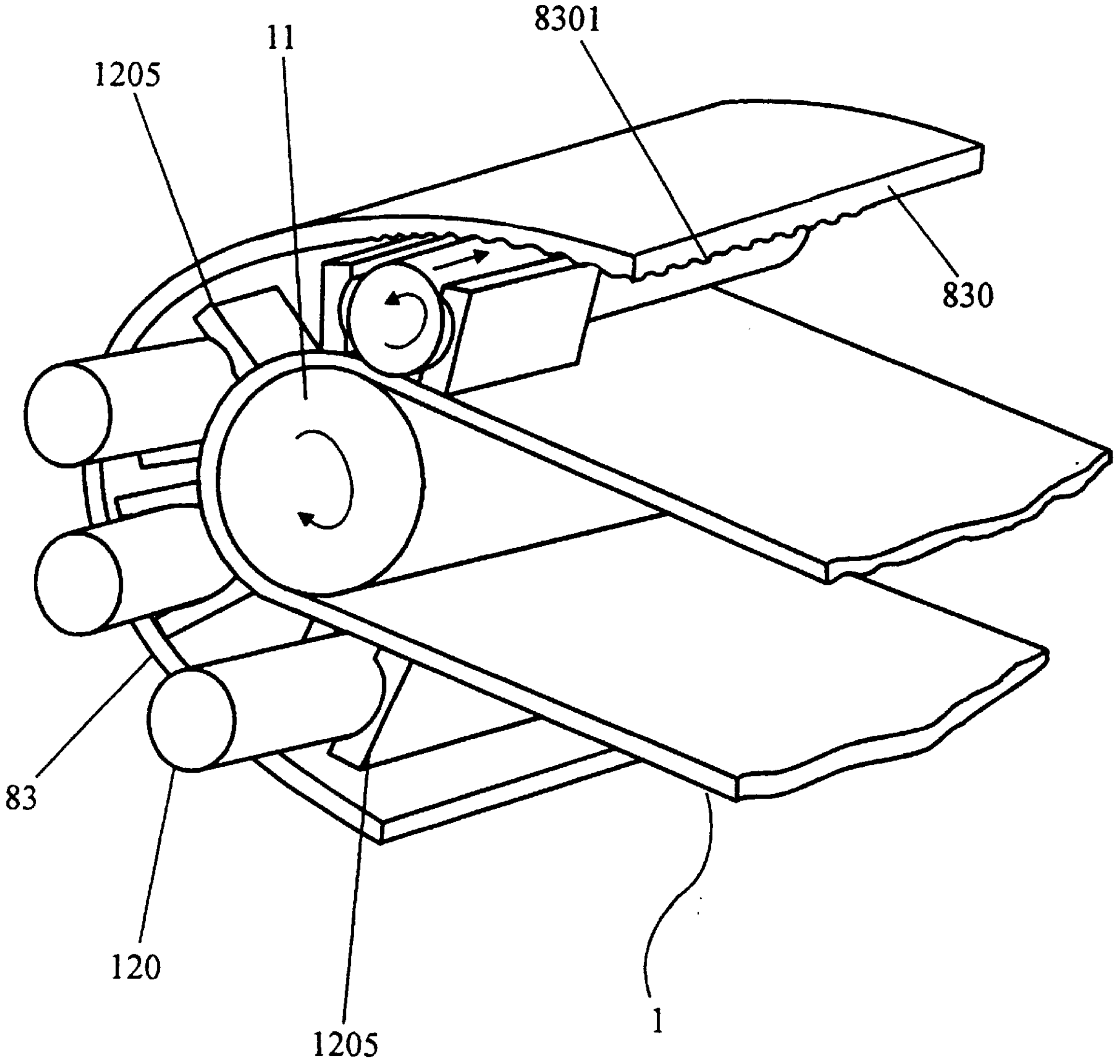
FIG. 13 is a fragmentary, perspective view showing details of a deflection as is shown in FIG. 12 in a reversal zone at the front of the conveyor.

As is shown in FIG. 13, the reversing zone at the front of the conveyor 1 is enclosed in a cage 83 which prevents the solid cylinders 120 from falling out of the clamping jaws 1205 while also serving as the deflecting element 8.

To this end, the cage 83 encloses the conveyor 1 so closely from the turning point on that the solid cylinders 120 are held by friction between the conveyor 1 and an inner top wall 830 of the cage 83. Furthermore, a portion of the inner top wall 830 has a tooth profile 8301 inclined in the direction of the guide plate 2 and running diagonally to the direction of transport. Due to the force-locking connection between the solid cylinder 120 and the inner top wall 830 or the tooth profile 8301, an elastic counter-profile is impressed into a jacket surface 1206 of the solid cylinder 120, and the latter is rotated so as to move perpendicular to the direction of transport and toward the guide plate 2. The force-locking connection and tooth profile 8301 are provided in such a way that the solid cylinder 120 only moves so far outward that there is a slight distance between the end surface 1204 of the solid cylinder 120 and the guide plate 2 and a thin piece of mail 3 can be lightly held. With thick pieces of mail 3, the cylinders slide back in adjustment.

Figure 14:
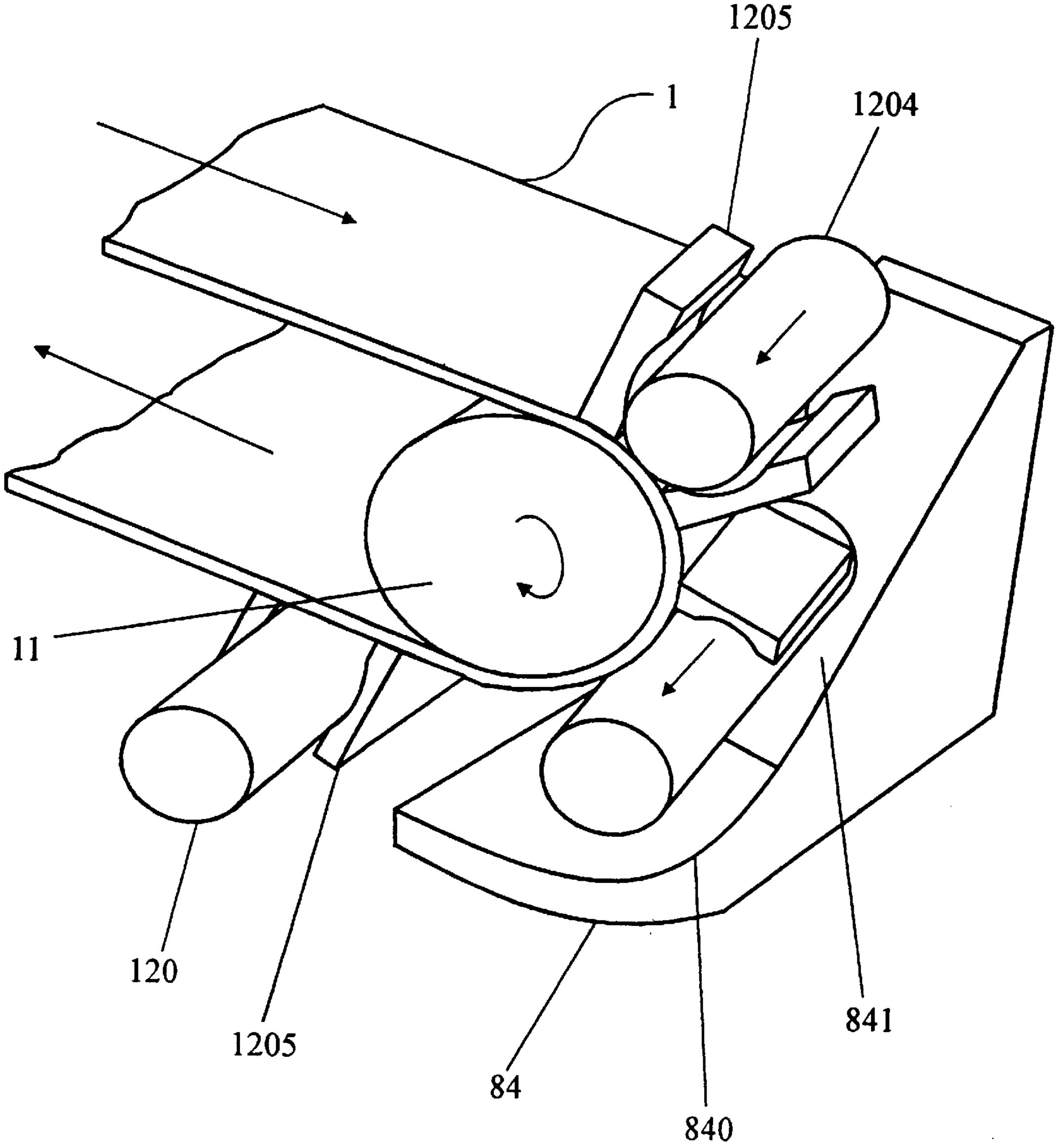
FIG. 14 is a fragmentary, perspective view showing details of the deflection as is shown in FIG. 12 in a reversal zone at the rear of the conveyor.

FIG. 14 represents the prevailing conditions at the rear reversing zone of the conveyor 1. In this case, a cage 84 encloses the conveyor 1 and the cage likewise prevents the solid cylinders 120 from falling out of the clamping jaws 1205 while also serving as a deflecting element. To this end, an inner side wall 841 adjacent the guide plate 2 is angled outward.

The loose solid cylinders 120 slide with their end surface 1204 along the inner side wall 841 and are thus pushed so far outward that the thickest permissible piece of mail 3 easily fits between the end surface 1204 and the guide plate 2, and is thus released.

An inner top wall 840 of the cage 84 is at such a distance from the conveyor 1 as to ensure that the solid cylinders 120 are loosely held. The cage 84 encloses a sufficient length of the conveyor 1 to ensure that the solid cylinders 120 are again clamped between the clamping jaws 1205 as they leave the reversing zone.

We claim:

1. A device for printing stock standing on edge, comprising:

a guide plate inclined relative to the vertical and having one side along which stock slides on edge in a transport direction during transport and printing, another side facing away from the stock, a downstream end, a recessed region having at least one cutout, and a region following said at least one cutout toward said downstream end being free of contact with the stock;

means for applying an advancing force to the stock to advance the stocks along said guide plate in the transport direction;

at least one ink jet print head of an ink jet printing device located at said other side of said guide plate at said recessed region; and pressure elements movable toward and away from said guide plate for pressing the stock against said guide plate and establishing a force-locking connection with a side of the stock facing away from said guide plate during transport and printing.

2. The device according to claim 1, wherein said one side of said guide plate is a bearing surface for the stock, and said region of said guide plate downstream of said at least one cutout is recessed relative to said bearing surface.

3. The device according to claim 1, wherein at least one cutout of said recessed region has an open downstream end.

4. The device according to claim 1, wherein said guide plate is a planar plate against which one surface of the stock rests, and said planar plate has sliding rails extending in the transport direction.

5. The device according to claim 1, wherein said guide plate is bent in an L-shape and has a short leg on which the stock stands on one edge and a long leg having sliding rails against which one surface of the stock rests.

6. The device according to claim 5, wherein said at least one ink jet print head prints an image with a given width, and said sliding rails in said region downstream of said at least one cutout are separated by a distance greater than said given width and have a thickness greater than an expected convexity of the stock in a printed area.

7. The device according to claim 1, wherein said guide plate is inclined relative to the vertical by approximately 18°.

8. The device according to claim 1, wherein said at least one ink jet print head has a nozzle plane, said guide plate has a stainless steel insert with at least one cutout, integral sliding rails, a region upstream of said at least one cutout and a downstream region, and said region upstream of said at least one cutout, said nozzle plane and said downstream region are progressively recessed.

9. The device according to claim 1, wherein said at least one cutout is a plurality of cutouts, and said at least one ink jet print head is a plurality of ink jet print heads each dedicated to a respective one of said cutouts.

10. The device according to claim 1, wherein said at least one cutout is two cutouts, and said at least one ink jet print head is a single, height-adjustable ink jet print head for both of said cutouts.

11. The device according to claim 1, wherein said pressure elements are spring-mounted, powered rollers.

12. The device according to claim 1, wherein the stock is a piece of mail and the device is part of a postage meter.

13. A device for printing stock standing on edge, comprising:

a guide plate inclined relative to the vertical and having one side along which stock slides on edge in a transport direction during transport and printing, another side facing away from the stock, a downstream end, a recessed region having at least one cutout, and a region following said at least one cutout toward said downstream end being free of contact with the stock;

a rotating conveyor for applying an advancing force to the stock to advance the stock along said guide plate in the transport direction;

at least one ink jet print head of an ink jet printing device located at said other side of said guide plate at said recessed region; and pressure elements movable toward and away from said guide plate at said conveyor for pressing the stock against said guide plate and establishing a force-locking connection with a side of the stock facing away from said guide plate during transport and printing.

14. The device according to claim 13, wherein said one side of said guide plate is a bearing surface for the stock, and said region of said guide plate downstream of said at least one cutout is recessed relative to said bearing surface.

15. The device according to claim 13, wherein at least one cutout of said recessed region has an open downstream end.

16. The device according to claim 13, wherein said guide plate is a planar plate against which one surface of the stock rests, and said planar plate has sliding rails extending in the transport direction.

17. The device according to claim 16, wherein the stock stands on one edge on said conveyor.

18. The device according to claim 13, wherein said guide plate is bent in an L-shape and has a short leg on which the stock stands on one edge and a long leg having sliding rails against which one surface of the stock rests.

19. The device according to claim 18, wherein said at least one ink jet print head prints an image with a given width, and said sliding rails in said region downstream of said at least one cutout are separated by a distance greater than said given width and have a thickness greater than an expected convexity of the stock in a printed area.

20. The device according to claim 13, wherein said guide plate is inclined relative to the vertical by approximately 18°.

21. The device according to claim 13, wherein said at least one ink jet print head has a nozzle plane, said guide plate has a stainless steel insert with at least one cutout, integral sliding rails, a region upstream of said at least one cutout and a downstream region, and said region upstream of said at least one cutout, said nozzle plane and said downstream region are progressively recessed.

22. The device according to claim 13, wherein said clamping elements are strip-shaped, are formed of an elastic material, are perpendicular to the transport direction and have an end facing away from said guide plate at which said clamping elements are fastened to said conveyor.

23. The device according to claim 22, wherein said clamping elements are fastened on edge for deflecting in a direction opposite the transport direction.

24. The device according to claim 22, wherein said clamping elements lie flat and are fastened for deflecting away from said conveyor.

25. The device according to claim 22, wherein said clamping elements are formed of a material selected from the group consisting of rubber and polyurethane.

26. The device according to claim 13, wherein said pressure elements are ring-shaped, are formed of an elastic material, stand on edge, and have a ring edge with a small spot fastened to said conveyor for deflecting opposite the transport direction.

27. The device according to claim 26, wherein said spot at which said ring-shaped pressure elements are fastened is in an approximate center of said conveyor.

28. The device according to claim 27, wherein said spot at which said ring-shaped pressure elements are fastened is at a greatest possible distance from said guide plate.

29. The device according to claim 26, wherein said clamping elements are formed of a material selected from the group consisting of rubber and polyurethane.

30. The device according to claim 13, wherein said pressure elements are U-shaped clamping elements formed of an elastic material, are perpendicular to said transport direction, and have legs facing away from said guide plate at which said pressure elements are fastened to said conveyor on edge.

31. The device according to claim 30, wherein said U-shaped clamping elements have a semi-circular region fastened to said conveyor on edge for deflecting opposite the transport direction.

32. The device according to claim 30, wherein said clamping elements are formed of a material selected from the group consisting of rubber and polyurethane.

33. The device according to claim 13, wherein each of said pressure elements is a spring-mounted bracket having a pressure plate, a top plate, a rear wall, an axle fastened between said pressure plate and said rear wall, a bearing bracket, a friction bearing connected to said bearing bracket, said axle being mounted perpendicular to the transport direction in said friction bearing, and a mating plate with pins for separably fastening said bearing bracket to said conveyor.

34. The device according to claim 33, including a friction lining covering a portion of an outer surface of said pressure plate, and a U-shaped spring disposed behind said pressure plate, said U-shaped spring having a center section fastened to said axle and free legs fastened to said bearing bracket.

35. The device according to claim 34, wherein bearing bracket has a rear wall, said free legs of said spring are form-lockingly connected in cutouts formed in said rear wall of said bearing bracket, and said free legs of said spring have ends protruding slightly over said rear wall and serving as a buffered stop for said rear wall of said bracket.

36. The device according to claim 34, wherein said U-shaped spring is formed of a material selected from the group consisting of rubber and polyurethane.

37. The device according to claim 33, wherein said pins are integral and mushroom-shaped crowned pins, said rotating conveyor includes a synchronous belt, two toothed rollers with tooth spaces, an incremental transducer and an axle, said toothed rollers include a powered roller, said powered roller together with said incremental transducer are mounted on said axle in the vicinity of a print area, said synchronous belt has a portion with holes formed therein in the vicinity of said tooth spaces, for separably fastening said pressure elements, said mating plate is placed in one of said tooth spaces permitting said pins to protrude through said holes, and said bearing bracket has a lower surface with a T-shaped cutout with which said bracket is slid over said pins.

38. The device according to claim 33, including deflecting elements located outside said conveyor but in a path of said clamping elements for deflecting said clamping elements as much as possible in areas in which the stock enters and exits, and said clamping elements being free of contact with said deflecting elements in remaining areas, said individual deflecting element each being a plate-like connecting link curving gradually outward toward the front or rear, and said rear wall of said bracket including and extension brought into engagement with said deflecting element.

39. The device according to claim 13, including clamping jaws fastened to said conveyor, said pressure elements being elastic solid cylinders held perpendicular to the transport direction by a force-locking connection in said clamping jaws.

40. The device according to claim 39, wherein said solid cylinders and the clamping jaws are formed of a material selected from the group consisting of rubber and polyurethane.

41. The device according to claim 39, including a cage surrounding a front reversing zone of said conveyor, said cage having an inside top wall with a portion constructed as a toothed profile angled in the direction of said guide plate and diagonal to the transport direction, said solid cylinders being guided by friction between said profile and said conveyor, and another cage surrounding a rear reversing zone of said conveyor, said other cage having an inner side wall adjacent said guide plate and angled outward away from said guide plate, and said solid cylinders having an end surface resting against said inner side wall.

42. The device according to claim 13, wherein said rotating conveyor includes a synchronous belt, two toothed rollers including a powered roller, an incremental transducer and an axle, said powered roller together with said incremental transducer being mounted on said axle in a vicinity of a print area.

43. The device according to claim 42, wherein said synchronous belt has a portion with holes formed therein in the vicinity of tooth spaces, for separably fastening said pressure elements.

44. The device according to claim 13, wherein said pressure elements are glued or bonded to said conveyor.

45. The device according to claim 13, including deflecting elements located outside said conveyor but in a path of said clamping elements for deflecting said clamping elements as much as possible in areas in which the stock enters and exits, and said clamping elements being free of contact with said deflecting elements in remaining areas.

46. The device according to claim 13, wherein said at least one cutout is a plurality of cutouts, and said at least one ink jet print head is a plurality of ink jet print heads each dedicated to a respective one of said cutouts.

47. The device according to claim 13, wherein said at least one cutout is two cutouts, and said at least one ink jet print head is a single, height-adjustable ink jet print head for both of said cutouts.

48. The device according to claim 13, wherein the stock is a piece of mail and the device is part of a postage meter.

49. The device according to claim 1, wherein the stock is a piece of mail and the device is part of an addressing machine.

50. The device according to claim 13, wherein the stock is a piece of mail and the device is part of an addressing machine.

* * * * *